(12) United States Patent
O'Brien (10) Patent No.: US 7,287,576 B2
(45) Date of Patent: Oct. 30, 2007

(54) UNIVERSAL FAN FOR MOTOR VEHICLE HEAT EXCHANGER

(76) Inventor: Stephen O'Brien, 7909 Summit Cove, Fort Worth, TX (US) 76179

(*) Notice: Subject to any disclaimer, the term of this patent is extended or adjusted under 35 U.S.C. 154(b) by 0 days.

(21) Appl. No.: 11/591,833

(22) Filed: Nov. 2, 2006

(65) Prior Publication Data

US 2007/0095511 A1    May 3, 2007

Related U.S. Application Data

(60) Provisional application No. 60/732,866, filed on Nov. 2, 2005.

(51) Int. Cl.
   *F04D 29/64* (2006.01)
(52) U.S. Cl. .................. 165/121; 248/291.12
(58) Field of Classification Search ........... 165/41, 165/121, 122; 248/291.12
   See application file for complete search history.

(56) References Cited

U.S. PATENT DOCUMENTS

| | | | | |
|---|---|---|---|---|
| 1,995,656 A | * | 3/1935 | Stout | 248/292.1 |
| 4,685,513 A | * | 8/1987 | Longhouse et al. | 165/121 |
| 4,805,868 A | * | 2/1989 | Claude | 248/603 |
| 5,341,871 A | * | 8/1994 | Stelzer | 165/121 |
| 5,348,079 A | | 9/1994 | Tanaka | |
| 5,452,875 A | * | 9/1995 | Kern | 248/242 |
| 5,456,089 A | | 10/1995 | O'Brien | |
| 5,498,130 A | * | 3/1996 | Wakley et al. | 415/213.1 |
| 5,509,276 A | | 4/1996 | O'Brien | |
| 5,522,457 A | * | 6/1996 | Lenz | 165/121 |
| 5,535,819 A | | 7/1996 | Matsuura | |
| 5,685,364 A | | 11/1997 | Harris | |
| 5,697,431 A | | 12/1997 | Nagasaka | |
| 5,875,836 A | * | 3/1999 | Nakamura | 165/122 |
| 6,071,078 A | * | 6/2000 | Schlegel et al. | 416/247 R |
| 6,079,949 A | * | 6/2000 | Litvin | 416/246 |
| 6,405,788 B1 | | 6/2002 | Balthazard | |
| 6,513,579 B1 | | 2/2003 | Kent et al. | |
| 6,682,319 B2 | * | 1/2004 | Kobayashi | 417/360 |
| 7,040,380 B1 | | 5/2006 | O'Brien | |
| 2002/0003034 A1 | | 1/2002 | Fukuoka et al. | |
| 2002/0056541 A1 | | 5/2002 | Kokubunji et al. | |
| 2003/0062456 A1 | * | 4/2003 | Nakagawa et al. | 248/200 |
| 2005/0092461 A1 | | 5/2005 | Kroetsch et al. | |

FOREIGN PATENT DOCUMENTS

JP    2004284514 A    * 10/2004

* cited by examiner

*Primary Examiner*—Allen J. Flanigan
(74) *Attorney, Agent, or Firm*—Bracewell & Giuliani LLP (57) ABSTRACT

A cooling system assembly for a vehicle includes a heat exchanger with a plurality of fins for the transfer of heat to air passing therebetween. The heat exchanger has a preselected length, width, and thickness such that the heat exchanger fits adjacent an engine of the vehicle. A plurality of fan assemblies are positioned adjacent each other and juxtaposed the heat exchanger so that the fan assemblies cause air to travel across the fins when the fan assemblies are operating. Mounting brackets protrude from a periphery of each of the fan assemblies. Each of the mounting brackets has a set of ratchet grooves formed thereon and a bore extending therethrough. A bracket member is associated with each of the plurality of mounting brackets that connects the mounting bracket to either the heat exchanger or to one of the mounting brackets of the other fan assembly.

20 Claims, 9 Drawing Sheets

UNIVERSAL FAN FOR MOTOR VEHICLE HEAT EXCHANGER

RELATED APPLICATIONS

This nonprovisional patent application claims the benefit of now abandoned, provisional patent application U.S. Ser. No. 60/732,866, filed on Nov. 2, 2005, which is hereby incorporated by reference in its entirety.

BACKGROUND OF THE INVENTION

1. Field of the Invention

This invention relates to cooling system assemblies in a motor vehicle, and in particular to fan assemblies which are connected to a radiator or condenser of a heat exchanger assembly.

2. Background of the Invention

Cooling systems for motor vehicles typically include a heat exchanger through which a coolant flows after passing through parts of an engine. Air passes over or through portions of the heat exchanger to cool the coolant before it is re-circulated back into the engine. Many heat exchangers utilize fins to increase the surface area of the heat exchanger over which the air flows in order to increase the efficiency of the heat exchange from the coolant to the air.

Fan assemblies are often used to help flow air across the heat exchanger. Due to various sizes of vehicles and their associated heat exchangers, the fan assemblies sometimes do not fit very easily it to the engine compartment adjacent the heat exchanger. Moreover, many times a single fan is used, leaving a large area of the heat exchanger without much assistance in air flow across the fins, thereby decreasing the efficiency of the heat exchanger. Furthermore, many fan assemblies are manufactured in a manner that does not allow the fan assemblies to be used across various sizes of heat exchangers. For example, prior fan assemblies often included mounting mechanisms that were molded to fit a specific size of a fan with a particular size of heat exchanger.

Prior fan assemblies are made so that one side is substantially flat and one side has the motor for the fan or impeller protruding beyond the fan screen. Therefore, in prior fan assemblies, the substantially flat side is the side that must be mounted against the heat exchanger. Sometimes this requires the wiring to be reversed in order to change the direction of rotation of the fan or impeller blades and thereby ensure that air is flowing across the heat exchanger in the proper direction. Such rewiring is necessary so that cool air from outside of the engine compartment is flows across the fins rather than hot air from inside of the engine compartment.

SUMMARY OF THE INVENTION

A cooling system assembly for a vehicle includes a heat exchanger with a plurality of fins for the transfer of heat to air passing therebetween. The heat exchanger has a preselected length, width, and thickness such that the heat exchanger fits adjacent an engine of the vehicle. A plurality of fan assemblies are positioned adjacent each other and juxtaposed the heat exchanger so that the fan assemblies cause air to travel across the fins when the fan assemblies are operating. Mounting brackets protrude from a periphery of each of the fan assemblies. Each of the mounting brackets has a set of ratchet grooves formed thereon and a bore extending therethrough. A bracket member is associated with each of the plurality of mounting brackets. The bracket member connects the mounting bracket to either the heat exchanger or to one of the mounting brackets of the other fan assembly.

When the bracket member connects the mounting bracket to the heat exchanger, the bracket member can include a support bracket that is positioned adjacent an edge of the heat exchanger. The support bracket can be L-shaped so that the support bracket engages at least two sides of the heat exchanger and can have a slot for receiving a threaded fastener to secure the support bracket to the heat exchanger. The support bracket can have a mating set of ratchet grooves for engaging the ratchet grooves of the mounting bracket.

When the bracket member connects the mounting bracket to the heat exchanger, the bracket member can be a strap down bracket that has a mating set of ratchet grooves for engaging the ratchet grooves of the mounting bracket. The strap down bracket can be adapted to receive an adjustable strap extending through the heat exchanger to secure the strap down bracket to the heat exchanger.

When the bracket member connects the mounting bracket to the heat exchanger, the bracket member can have a support bracket with a set of ratchet grooves that is positioned adjacent an edge of the heat exchanger, and an extension bracket connecting the support bracket to the mounting bracket. The extension bracket can have a pair of sets of ratchet grooves located at opposite end portions of the extension bracket. The extension bracket can have a predetermined length such that the extension bracket extends from the mounting bracket at an angle and the sets of ratchet grooves provide resistance to the fan assemblies moving out of position relative to the heat exchanger due to gravitational forces.

When the bracket member connects the mounting bracket to one of the mounting brackets of the other fan assembly, the bracket member can have a joining bracket. The joining bracket can include a pair of joining stabs. Each of the joining stabs stab into the bore of one of the mounting brackets adjacent a mounting bracket associated with the other fan assembly.

In the cooling system assembly, the fan assemblies can be scaleable in size such that a distance measured across both fans assemblies is less than or equal to the length of the heat exchanger. The mounting brackets can be positioned such that a distance between adjacent mounting brackets associated with the adjacent fan assemblies is substantially the same regardless of the size of the adjacent fan assemblies.

In the cooling system assembly, the fan assemblies can be scaleable in size such that the width of the heat exchanger is greater than or equal to the circumference of each of the fans assemblies In the cooling system assembly, each of the fan assemblies can have a fan housing with a substantially circular sidewall and a substantially flat rear screen. Each of the fan assemblies can also have an impeller blade and motor assembly that connects to the rear screen. Each of the fan assemblies can also have a substantially flat front screen that attaches to the fan housing. The impeller blade and motor assembly can be free of any portion extending out of the fan housing beyond the front screen, such that the fan assembly can be mounted to the either a front side or a rear side of the heat exchanger and force air across the fins of the heat exchanger.

In the cooling system assembly, the impeller blade of each fan assembly can rotate in a single direction when operating such that the fan assemblies either push air across the heat exchanger or pull air across the heat exchanger. Whether the air is being pushed or pulled across the heat exchanger is dependent upon which side of the heat exchanger the fan assemblies are positioned.

In another aspect of the invention, a cooling system assembly for a vehicle includes a heat exchanger with a plurality of fins for the transfer of heat to air passing therebetween. The heat exchanger has a pre-selected length, width, and thickness such that the heat exchanger fits adjacent an engine of the vehicle. A pair of fan assemblies are positioned adjacent each other and juxtaposed the heat exchanger so that the fan assemblies cause air to travel across the fins when the fan assemblies are operating. A first mounting bracket protrudes from a periphery of each of the fan assemblies. Each of the first mounting brackets has a set of ratchet grooves formed on its outer surface. A mounting assembly associated with each of the first mounting brackets connects the first mounting bracket to the heat exchanger. The mounting assembly has a mating set of ratchet grooves that engage the ratchet grooves of the first mounting bracket associated therewith. A second mounting bracket protrudes from a periphery of each of the fan assemblies, and is positioned such that the second mounting bracket associated with one of the pair of fan assemblies is adjacent the second mounting bracket of the other of the pair of fan assemblies. Each of the second mounting brackets has a bore formed therethrough. A coupling assembly connects the second mounting brackets positioned adjacent each other.

In the cooling system assembly, the mounting assembly can have a support bracket that is positioned adjacent an edge of the heat exchanger. The support bracket can be L-shaped so that the support bracket engages at least two sides of the heat exchanger, and can have a slot for receiving a threaded fastener to secure the support bracket to the heat exchanger. The mounting assembly can also include an extension bracket connecting the support bracket to the first mounting bracket. The extension bracket can have a pair of sets of ratchet grooves located at opposite end portions of the extension bracket. The extension bracket can have a predetermined length such that the extension bracket extends from the first mounting bracket at an angle, and the sets of ratchet grooves provide resistance to the fan assemblies moving out of position relative to the heat exchanger due to gravitational forces. There can also be a plurality of extension brackets having the predetermined length. Each comprising a pair of sets of ratchet grooves that are located at opposite end portions thereof so that the plurality of extension brackets connect the first mounting bracket with the support bracket, with each of the sets of ratchet grooves providing resistance to the fan assemblies moving out of position relative to the heat exchanger due to gravitational forces.

In the cooling system assembly, the mounting assembly can include a strap down bracket that is adapted to receive an adjustable strap extending through the heat exchanger, in order to secure the strap down bracket to the heat exchanger.

In the cooling system assembly, the coupling assembly can have a joining bracket. The joining bracket can have a pair of spaced-apart joining stabs that stab into the bores of the adjacent second mounting brackets. The joining bracket can also include a ratchet end that has a set of ratchet grooves formed on its outer surface, and the coupling assembly can also have another mounting assembly that connects the joining bracket to the heat exchanger. The additional mounting assembly can have a mating set of ratchet grooves that engage the ratchet grooves of the ratchet end.

In yet another aspect of the invention, a cooling system assembly for a vehicle includes a heat exchanger having a plurality of fins for the transfer of heat to air passing therebetween. The heat exchanger has a pre-selected length, width, and thickness such that the heat exchanger fits adjacent an engine of the vehicle. A plurality of fan assemblies are positioned adjacent each other and juxtaposed the heat exchanger so that the fan assemblies cause air to travel across the fins when the fan assemblies are operating. Each of the plurality of fan assemblies include a fan housing having a substantially circular sidewall and a substantially flat rear screen. Each of the plurality of fan assemblies also have an impeller blade and motor assembly that connects to the rear screen. Each of the plurality of fan assemblies also include a substantially flat front screen that attaches to the fan housing. Each of the plurality of fan assemblies also have a plurality of mounting brackets protruding from a periphery of each of the fan housings. Each of the mounting brackets has a set of ratchet grooves formed thereon and a bore extending therethrough. The cooling system also includes a bracket member associated with each of the plurality of mounting brackets. The bracket member connects the mounting bracket to either the heat exchanger or to one of the mounting brackets of the other fan assembly. The impeller blade and motor assembly is free of any portion extending out of the fan housing beyond the front screen, such that the fan assembly can be mounted to the either a front side or a rear side of the heat exchanger and force air across the fins of the heat exchanger. The impeller blade of each fan assembly rotates in a single direction when operating such that the fan assemblies either push air across the heat exchanger or pull air across the heat exchanger, depending upon which side of the heat exchanger the fan assemblies are positioned.

In the cooling system assembly, the fan assemblies can be scaleable in size such that a distance measured across both fans assemblies is less than or equal to the length of the heat exchanger. The mounting brackets can also be positioned such that a distance between adjacent mounting brackets associated with the adjacent fan assemblies is substantially the same regardless of the size of the adjacent fan assemblies.

DETAILED DESCRIPTION OF THE PREFERRED EMBODIMENT

Figure 1:
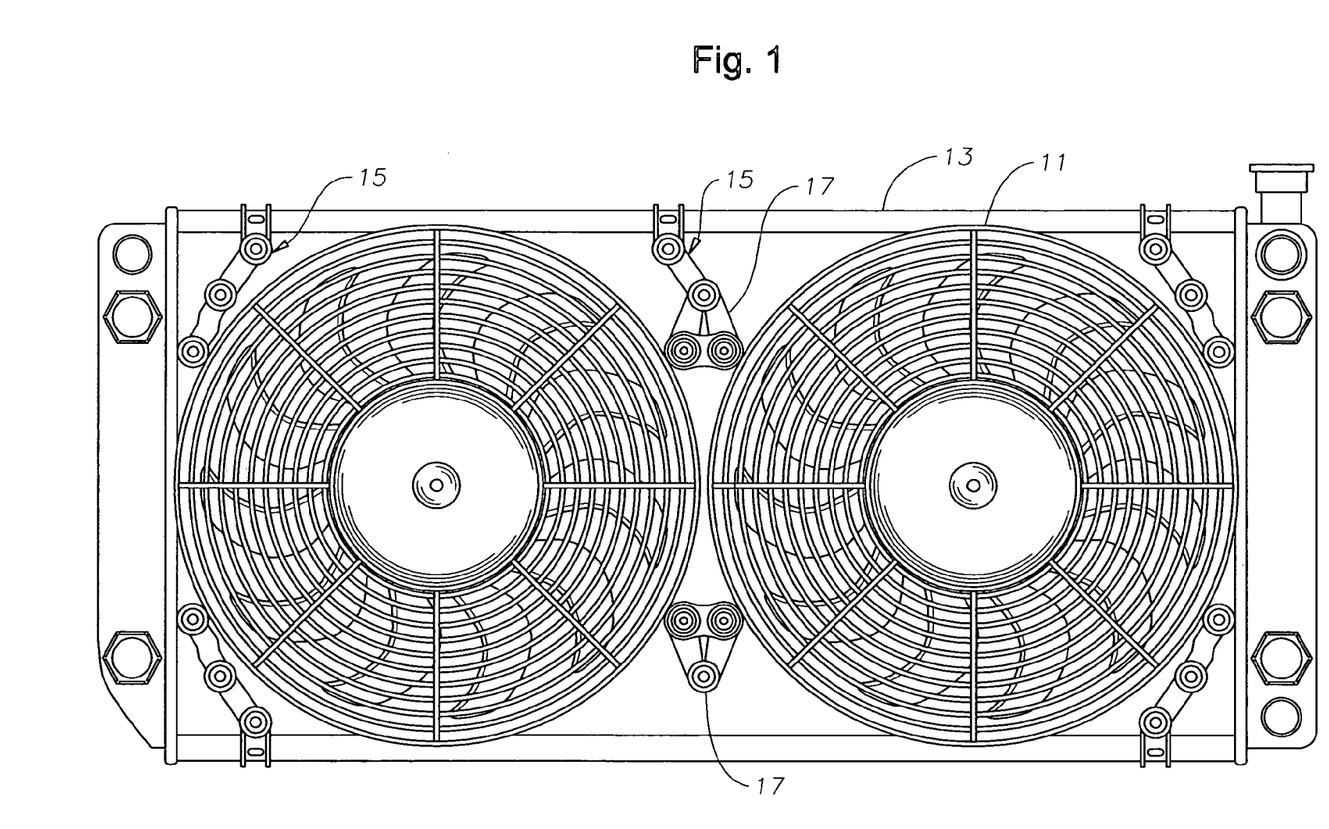
FIG. 1 is a perspective view of a heat exchanger assembly having a radiator and a fan assembly attached thereto in accordance with the present invention.

Referring to FIG. 1, a fan assembly 11 is shown connected to a heat exchanger or radiator 13. In the embodiment shown in FIG. 1, a plurality of fan assemblies 11 are connected to a side of radiator 13. As will be readily appreciated by those skilled in the art, radiator 13 is typically a heat exchanger used with automobiles for helping to cool a coolant that is communicated throughout the automobile's engine by creating air flow across the fins of radiator 13. As is also readily appreciated by those skilled in the art, fan assemblies 11 are sometimes positioned adjacent the side of radiator 13 so the fan assemblies 11 blow air across the fins of radiator 13, and fan assemblies 11 are sometimes positioned on the opposite side of radiator 13 so that fan assemblies 11 pull air across the fins of radiator 13. As will be shown herein, fan assemblies 11 can be positioned on either side of radiator 13 and the actual position of fan assemblies 11 in use is a function of the operator's desired purpose.

Figure 2:
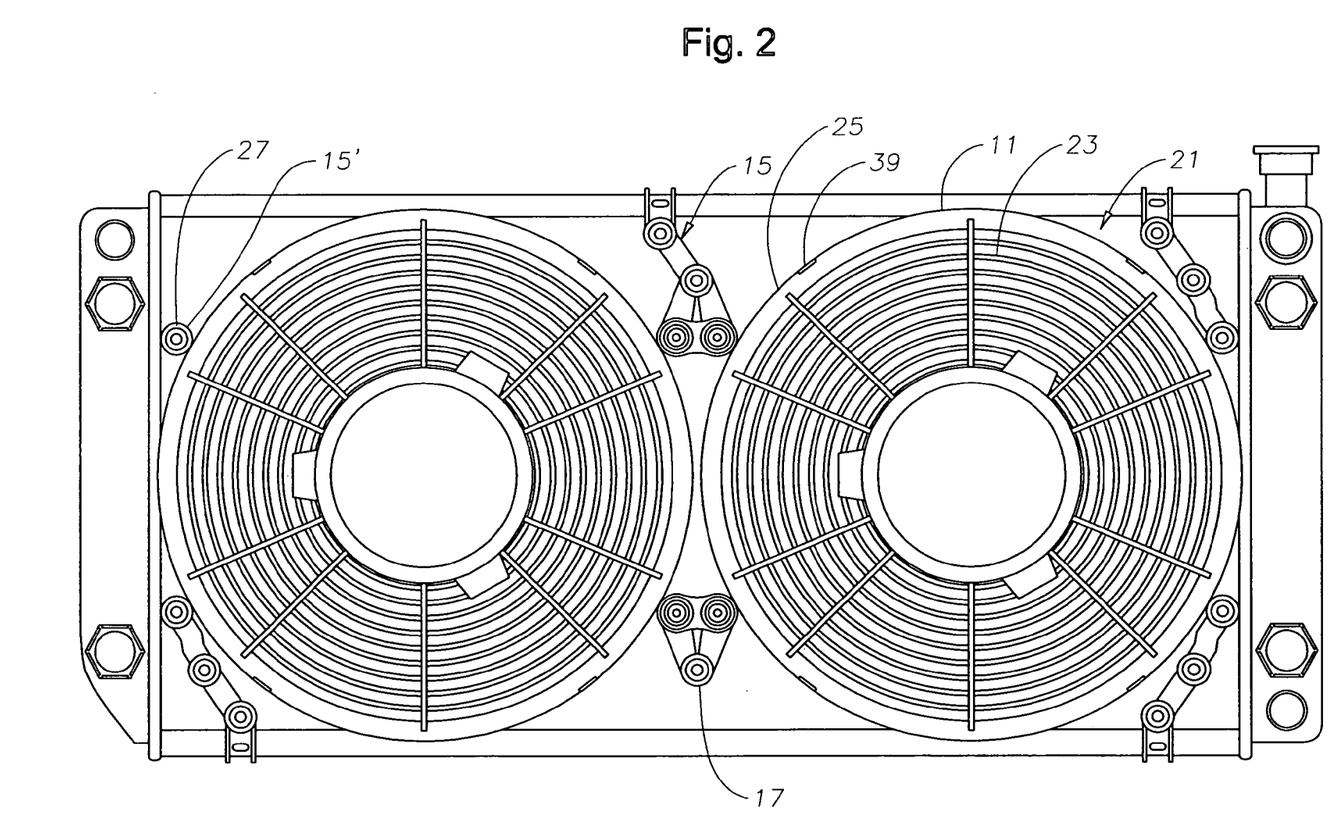
FIG. 2 is a perspective view of a heat exchanger assembly having a radiator and the fan housings of the fan assembly of FIG. 1 attached thereto in an alternate manner in accordance with the present invention.

A plurality of mounting assemblies 15 connect each fan assembly 11 to the side of radiator 13. In one embodiment, mounting assemblies 15 extend from an outer portion of each fan assembly 11 to an outer edge of radiator 13. As shown in FIG. 2, an alternative mounting assembly 15' can also be used to attach fan assembly 11 to radiator 13. Mounting assembly 15' utilizes such items known in the art as tie straps or ratchet straps that extend from mounting assembly 15' through the fins of radiator 13 to the opposite side of radiator 13 to attach fan assembly 11 to radiator 13. Referring back to FIGS. 1 and 2, in assemblies in which a pair of fan assemblies 11 are positioned adjacent to each other, a coupling assembly 17 helps hold each fan assembly 11 relative to each other. In the arrangement shown in FIGS. 1 and 2, a mounting assembly 15 extends from the upper coupling assembly 17 to help attach fan assemblies 11 to radiator 13. As is also shown in the arrangements in FIGS. 1 and 2, coupling 17 does not require a mounting assembly 15 to extend therefrom.

Figure 3:
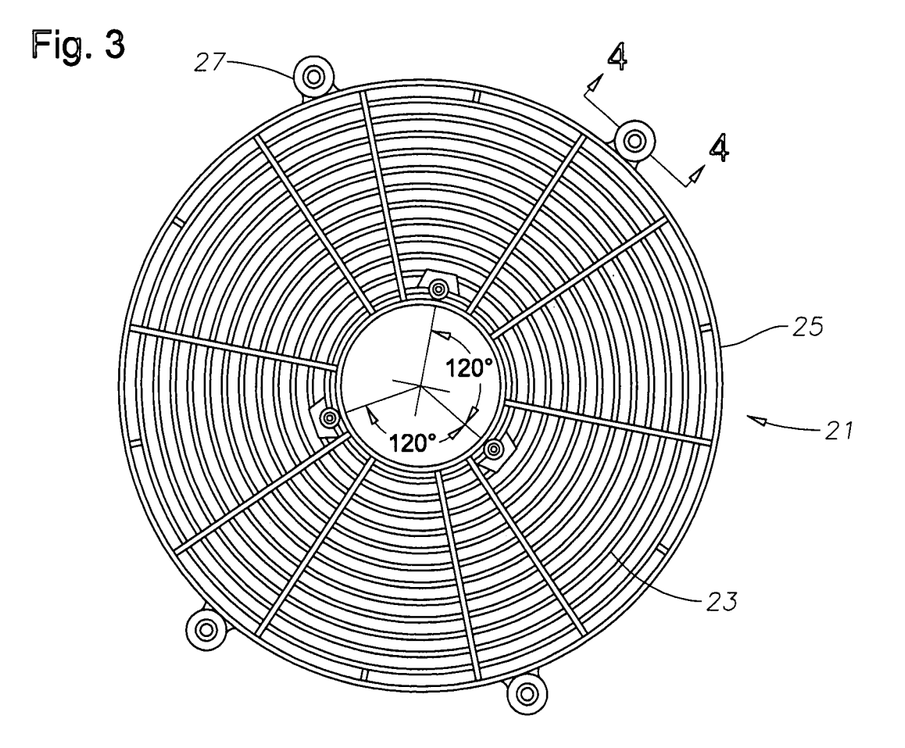
FIG. 3 is front view of one of the fan housings of FIG. 2.

Referring to FIG. 3, each fan assembly 11 comprises a fan housing 21 that houses and encloses the fan and motor assembly selectively pushing or pulling air across the fins of radiator 13. Fan housing 21 preferably includes an inlet screen 23 positioned within an outer casing 25. In the embodiment shown in FIGS. 1 and 2, inlet screen 23 is positioned adjacent the fins of radiator 13. However, when fan assemblies 11 are positioned on the opposite side of radiator 13, inlet screen 23 is positioned away from the fins of radiator 13. Outer casing 25 extends substantially perpendicular to inlet screen 23 away from the fins of radiator 13 and defines the operational width of fan assembly 11. A plurality of mounting brackets 27 are integrally formed at intermittent locations around the circumference of outer casing 25. Each mounting assembly 15 connects to mounting bracket 27 in order to attach each fan assembly 11 to radiator 13.

Figure 4:
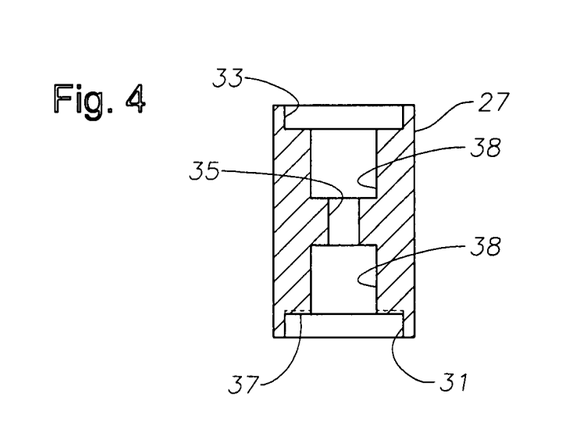
FIG. 4 is a sectional view along line 4-4 of the fan housing of FIG. 3.

As best shown in FIG. 4, each mounting bracket 27 is substantially cylindrically shaped with an axis extending substantially parallel to the central axis of fan housing 21. In the preferred embodiment, each mounting bracket 27 includes an inner opening 31 and an outer opening 33. In the embodiment shown in FIGS. 1 and 2, inner opening 31 is positioned adjacent radiator 13 in the same manner as inlet screen 23, while outer opening 33 is formed on the end of mounting bracket 27 extending away from the fins of radiator 13. A central passage 35 extends between inner and outer openings 31, 33. Central passage 35 provides a passageway for a bolt or threaded fastener (FIGS. 1 and 2) to securely fasten mounting bracket 27 with mounting assembly 15. In the preferred embodiment, a plurality of ratchet mounting grooves 37 are formed within each of inner and outer openings 31, 33 for engagement with mounting assemblies 15. An intermediate bore 38 is preferably formed between inner opening 31 and central passageway 35 and between outer opening 33 and central passage 35. In the preferred embodiment, inner and outer openings 31, 33 have a larger diameter than intermediate bore 38, and intermediate bore 38 has a larger diameter than central passage 35.

Referring back to FIG. 2, the fan housing 21 preferably includes a plurality of cover slots 39 formed intermittently around the outer circumference of outer casing 25.

Figure 5:
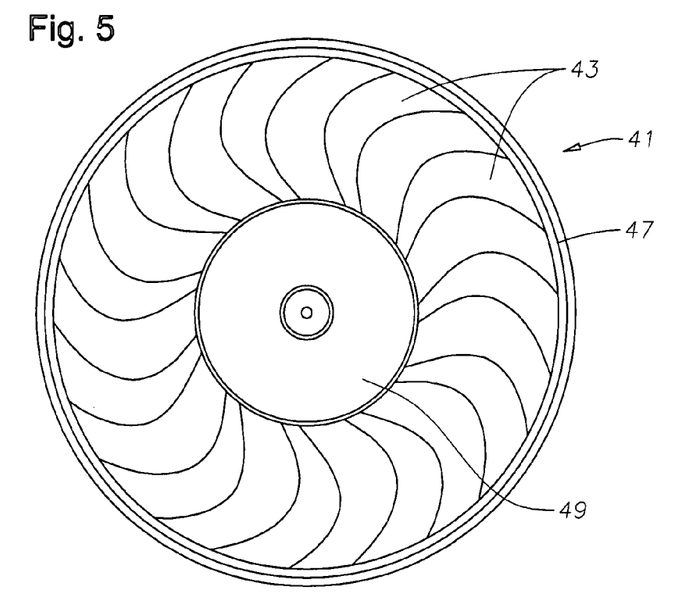
FIG. 5 is front view of one of the impeller blade and motor assemblies of the fan assemblies of FIG. 1.
Figure 6:
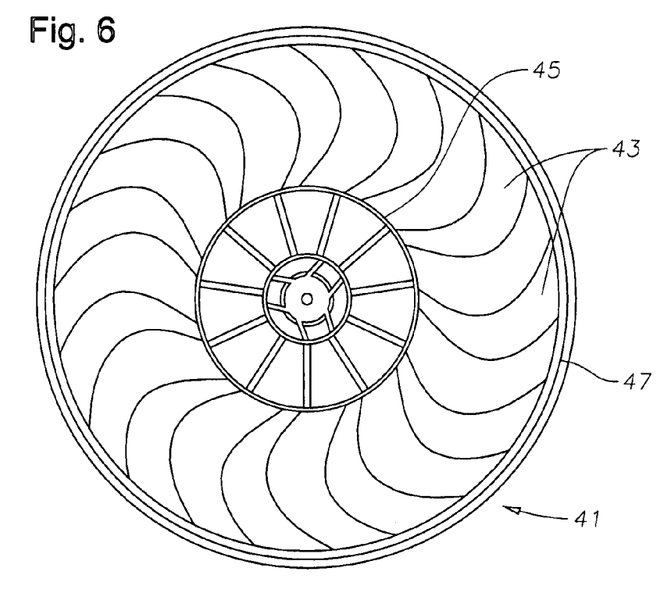
FIG. 6 is rear view of the impeller blade and motor assemblies of the fan assemblies of FIG. 5.
Figure 7:
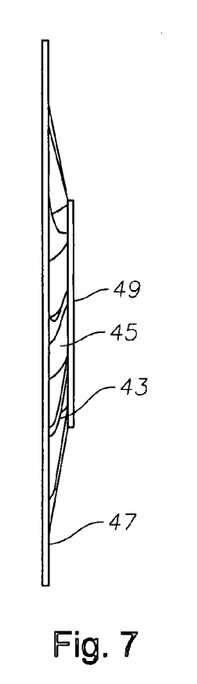
FIG. 7 is side view of the impeller blade and motor assemblies of the fan assemblies of FIG. 5.

Referring to FIGS. 5-7, a fan blade and motor assembly 41 of fan assembly 11 is shown. Fan blade and motor assembly 41 preferably includes a plurality of fan blades 43 extending from a central hub 45 to an outer ring 47. As will be readily appreciated by those skilled in the art, fan blades 43 are designed and positioned so that air is drawn across the fins of radiator 13 by the rotation of fan blades 43. A motor drive unit 49 is preferably positioned at a radially inward portion of fan blade and motor assembly 41 for rotating fan blades 43. Motor drive unit 49 preferably includes an electrical motor that can be provided electricity from the electrical system of the vehicle or automobile into which radiator 13 and fan assemblies 11 are positioned. As best shown in FIG. 7, fan blade and motor assembly 41 advantageously has a narrow width so that the entirety of fan blade and motor assembly 41 are housed within the width of fan housing 21 as defined by outer casing 25.

Figure 8:
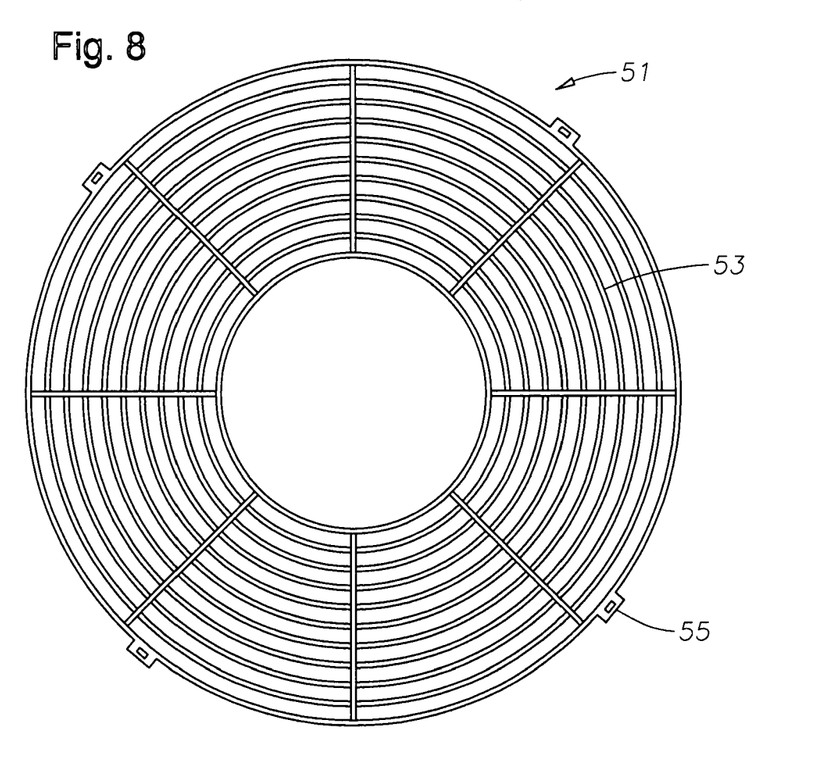
FIG. 8 is front view of a cover screen for one of the fan housings of FIG. 1.
Figure 9:
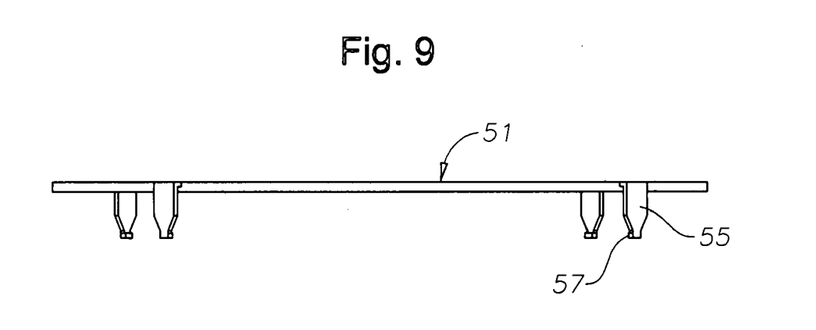
FIG. 9 is side view of the cover screen for one of the fan housings of FIG. 1.

Referring to FIGS. 8 and 9, each fan housing 21 of fan assemblies 11 preferably includes an outlet screen 51 that is positioned opposite inlet screen 23. In the preferred embodiment, outlet screen 51 is a separate housing member that attaches to outer casing 25 opposite from inlet screen 23. Outlet screen 51 preferably includes a plurality of circumferentially extending screen members 53 positioned at incrementally increasing positions from the radial center of outlet screen 51 to the outer circumference of outer screen 51. In the preferred embodiment, outlet screen 51 comprises a plurality of connector members 55 intermittently spaced around the outer circumference of outlet screen 51. Connector members 55 correspond to mounting slots 39 formed in outer casing 25. An inward facing shoulder 57 is formed on each connector member 55 for engagement with slots 39 to attach outlet screen 51 to outer casing 25.

Fan assembly 11 allows the user to install fan housing 21 on either side of radiator 13 with either outlet screen 51 or inlet screen 23 juxtaposed with the fins of radiator 13. Depending upon which screen 23,51 is positioned adjacent radiator 13 will determine whether fan assembly 11 is pulling or pushing air across the fins of radiator 13. Fan assembly 11 also allows operator to install the fan assembly within the automobile housing radiator 13 in a substantially uniform manner such that electrical connections do not have to be reversed in order to control the direction of rotation of fan blades 43. Rather, fan blades 43 rotate in the same direction no matter which side of radiator 13 fan assembly 11 is mounted. Mounting bracket 27 also allows for mounting on either side of radiator 13 due to having both inner and outer openings 31, 33 to engage mounting assemblies 15 on either side of radiator 13.

Figure 10:
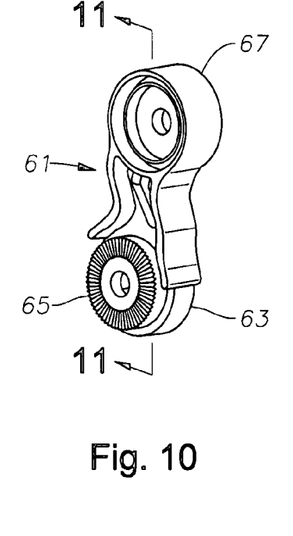
FIG. 10 is a perspective view of a connection bracket of the connector assemblies shown in FIG. 1.
Figure 11:
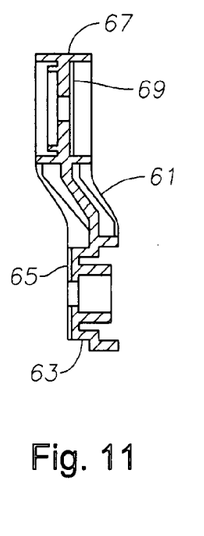
FIG. 11 is a sectional view along line 11-11 of the connection bracket of FIG. 10.

Referring back to FIGS. 1 and 2, mounting assemblies 15 are shown connecting fan assemblies 11 to radiator 13. In the preferred embodiment, mounting assemblies 15 comprise a plurality of inner connecting linkages extending from mounting bracket 27 of fan housing 21. Referring to FIGS. 10 and 11, an extension bracket 61 of mounting assembly 15 is shown. Extension bracket 61 provides an adjustable linkage that connects directly to mounting bracket 27 of fan housing 21. Extension bracket 61 comprises a stab end 63 with ratchet grooves 65 for engagement with ratchet mounting grooves 37 of one of inner or outer openings 31, 33 of mounting bracket 27. Ratchet grooves 65 engage ratchet mounting grooves 37 of mounting bracket 27 in a frictional manner such that extension bracket 61 does not rotate about mounting bracket 27. Extension bracket 61 also preferably includes a receptacle end 67 having ratchet grooves 69 formed within. Ratchet grooves 69 engage a stab end of another member of mounting assembly 15. As best shown in FIGS. 1 and 2, a plurality of connection brackets 61 can be interconnected to extend from mounting bracket 27 toward an edge of radiator 13 for connecting fan assembly 11 to radiator 13.

Figure 12:
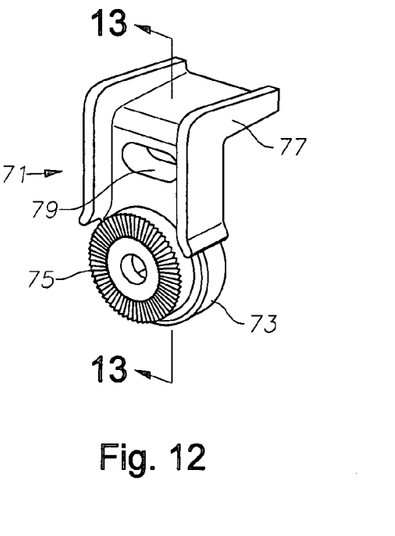
FIG. 12 is a perspective view of a mounting bracket of the connector assemblies shown in FIG. 1.
Figure 13:
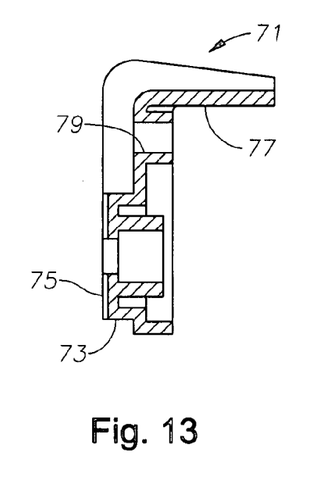
FIG. 13 is a sectional view along line 13-13 of the mounting bracket of FIG. 12.

Referring to FIGS. 12 and 13, a mounting bracket 71 can be used as part of mounting assembly 15 for attaching fan assembly 11 with radiator 13. Mounting bracket 71 preferably includes a stab end 73 having ratchet grooves 75 that stab into and engage ratchet grooves 69, 37 within a receptacle end 67 or one of inner or outer openings 31, 33. Mounting bracket 71 also preferably includes a right angle mount 77 that extends over and onto an edge of radiator 13. Mounting bracket 71 also preferably includes a mounting slot 79 for receiving a threaded fastener (FIGS. 1 and 2) to securely fasten mounting bracket 71 to radiator 13. As best shown in FIGS. 1 and 2, a plurality of extension brackets 61 and mounting brackets 71 can be utilized in a number of combinations to extend the required length from mounting bracket 27 of fan housing 21 to securely fasten fan assembly 11 to an edge of radiator 13.

Figure 14:
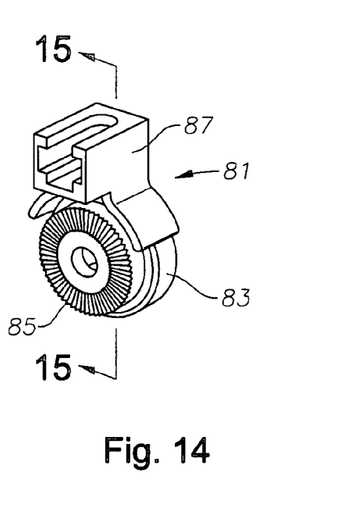
FIG. 14 is a perspective view of an alternate mounting bracket of the connector assemblies shown in FIG. 2.
Figure 15:
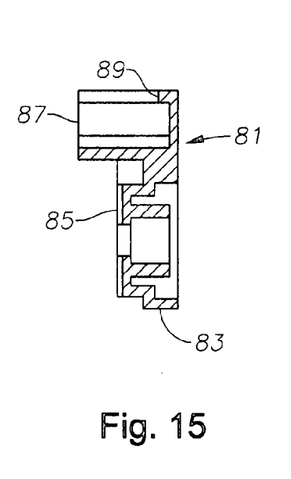
FIG. 15 is a sectional view along line 15-15 of the mounting bracket of FIG. 14.

Referring to FIGS. 14 and 15, a strap down mounting bracket 81 is illustrated. Strap down mounting bracket 81 provides the operator with a member for connecting mounting assembly 15 to radiator 13 without having to extend mounting assembly 15 to the edge of radiator 13. An example of strap down mounting bracket 81 is shown in FIG. 1 with mounting assembly 15'. In the preferred embodiment, strap down mounting bracket 81 comprises a stab end 83 having a plurality of ratchet grooves extending therefrom. Stab end 83 and ratchet grooves 85 are designed in a similar manner to stab end 73 and ratchet groove 75 of mounting bracket 71 to stab into a receptacle end of either extension bracket 61 or mounting bracket 27. Strap down mounting bracket 81 also preferably comprises a strap down mount 87 integrally formed adjacent stab end 83 with a strap down slot 89. Strap down mount 87 provides a base mount for securing strap down mounting bracket 81 relative to radiator 13 with a tie strap or ratchet strap that can slide through radiator 13 and attach to the opposite side of radiator fins from the side fan assembly 11 as connected thereto.

Figure 19A:
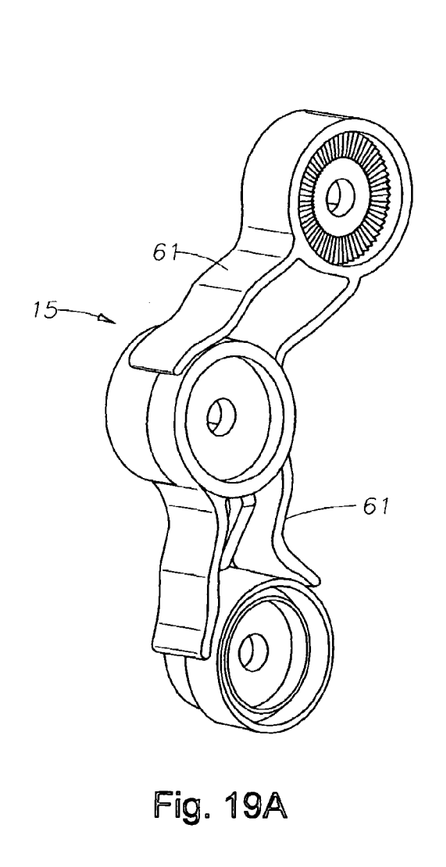
FIGS. 19A-19C are perspective views a plurality of mounting brackets of FIG. 1 that are formed with the connector brackets of FIG. 10 and the mounting brackets of FIGS. 12 and 14.
Figure 19B:
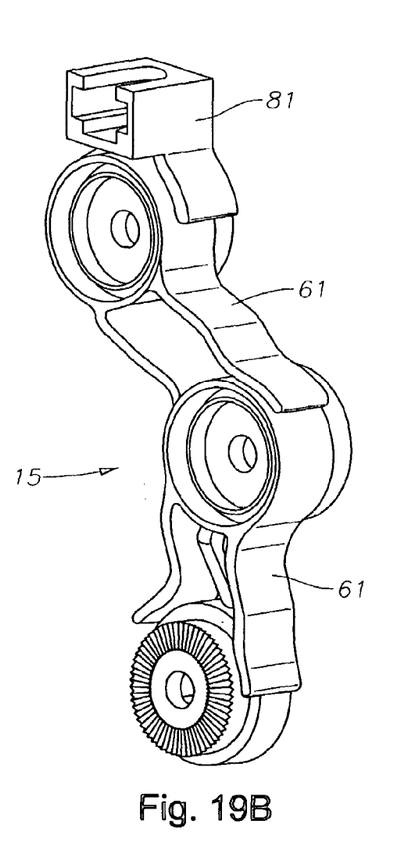
Figure 19C:
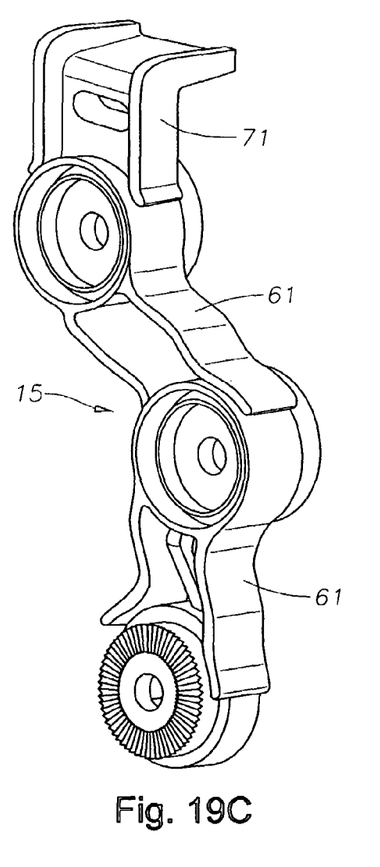
Figure 20:
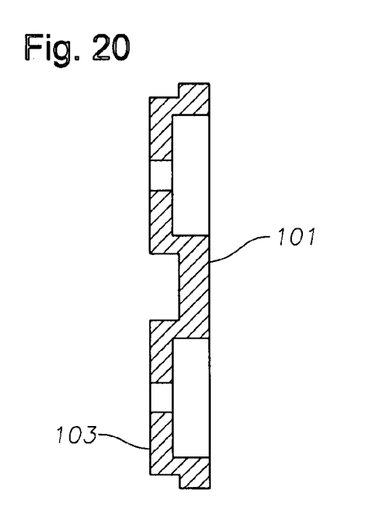
FIG. 20 is a sectional view along line 20-20 of the joining shroud of FIG. 18.
Figure 21A:
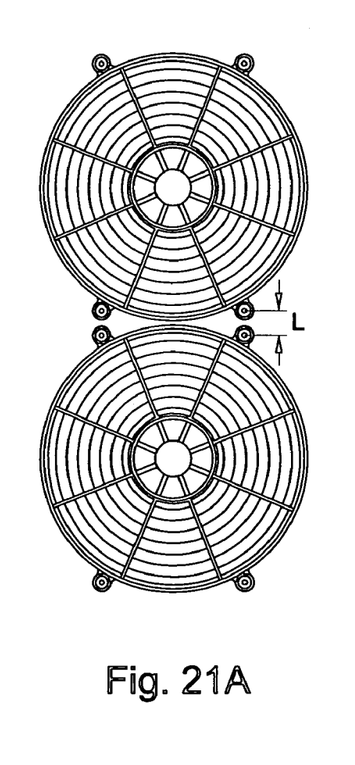
FIGS. 21A-21C are front views of a plurality of fan assembly arrangements that are formed with the fan assemblies, mounting assemblies, and joining assemblies of FIG. 1.
Figure 21B:
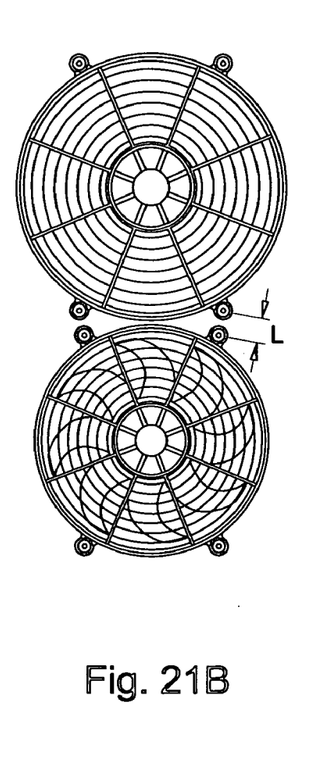
Figure 21C:
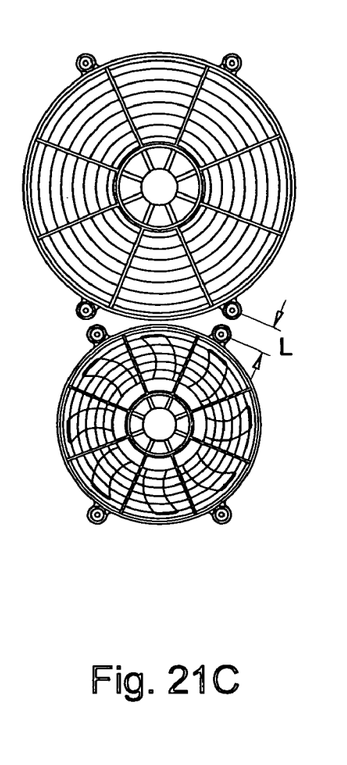
Figure 21D:
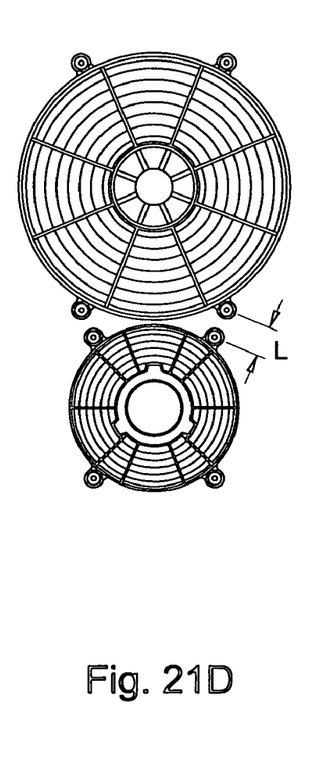

Referring to FIGS. 19A-19C, those skilled in the art will readily appreciate that extension bracket 61, mounting bracket 71 and strap down mounting bracket 81 can be combined in various combinations to provide a variety of options for mounting fan assembly 11 to radiator 13. As is also best shown in FIGS. 19A-19C, when a desired combination of extension brackets 61, mounting brackets 71, and strap down mounting brackets 81 is obtained, a threaded fastener can be inserted through receptacle ends to securely connect brackets 61, 71, and 81 with each other so that the ratchet grooves do not slide relative to each other.

Figures 16, 17:
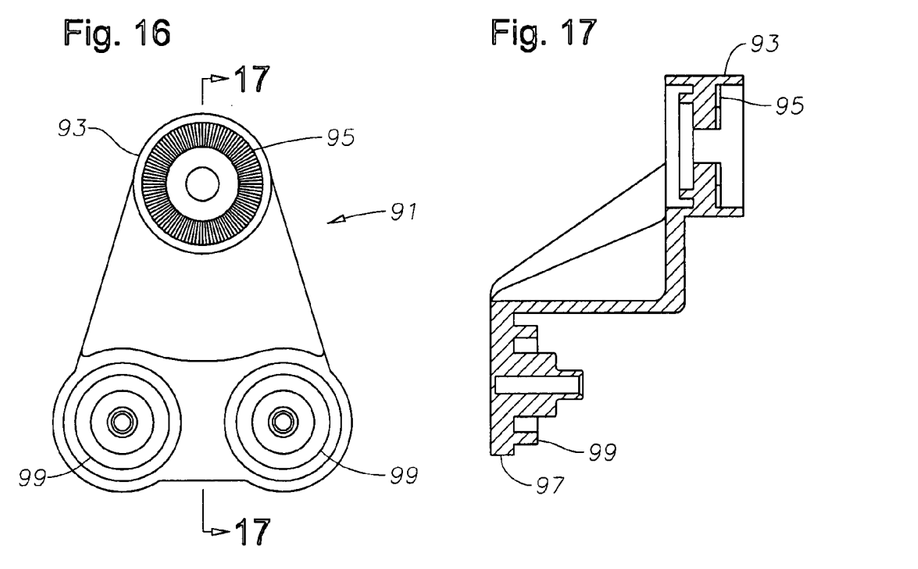
FIG. 16 is a front view of a joining bracket of the coupling assemblies shown in FIG. 1.
FIG. 17 is a sectional view along line 17-17 of the joining bracket of FIG. 16.

Referring to FIGS. 1, 16, and 17, coupling assembly 17 preferably includes a joining bracket 91 for connecting a pair of mounting brackets 27 of two adjacent fan assemblies 11. Joining brackets 91 comprise a receptacle end 93 having a plurality of ratchet grooves 95 formed thereon. Ratchet grooves 95 can be used to engage a receptacle end 67 of extension bracket 61. Joining bracket 91 also preferably includes a stab end 97 having a plurality of joining stabs 99 positioned adjacent to each other. Joining stabs 99 are preferably positioned such that each joining stab 99 can stab into inner or outer openings 31, 33 of two adjacent mounting brackets 27. Joining bracket 91 secures a pair of fan assemblies 11 relative to each other. Through the use of joining brackets 91, strap down mounting brackets 81, mounting brackets 71, and extension brackets 61, a plurality of combinations of fan assemblies 11 can be used adjacent each other. Various combinations of different sizes of fan assemblies 11 that can be mounted to radiator 13 are shown in FIGS. 21A-21D. As is also shown in FIGS. 19A-19C, regardless of which combination of different sizes are used, the mounting brackets 27 positioned adjacent each other for connection with joining brackets 91 are a common length L apart, such that joining bracket 91 can have a uniform size for use with various sizes and combinations of fan assemblies 11.

Figure 18:
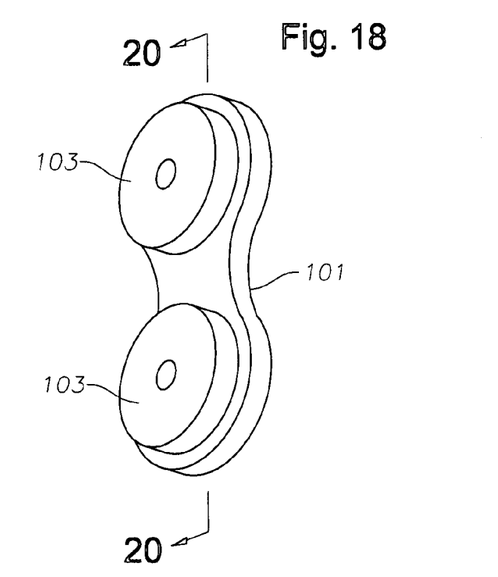
FIG. 18 is a perspective view of a joining shroud of the coupling assemblies shown in FIG. 1.

Referring to FIGS. 17 and 18, a joining shroud 101 of coupling assembly 17 is illustrated. Joining shroud 101 advantageously closes the other of inner or outer openings 31, 33 that joining stabs 99 did not engage. Joining shroud 101 preferably includes a pair of shroud stabs 103 for insertion into the other of inner and outer openings 31, 33 that were not engaged by joining stab 99 of joining bracket 91. In the preferred embodiment, joining stab 99 stabs into one of inner or outer openings 31, 33 of a pair of adjacent mounting brackets 27 and engages intermediate bore 38 of each mounting bracket 27. As best shown in FIG. 1, joining bracket 91 can optionally be utilized with mounting bracket 15 having a combination of extension brackets 61, mounting brackets 71, or strap down mounting brackets 81.

The description and figures are merely illustrative of various embodiments. While the invention has been shown in only some of its forms, it should be apparent to those skilled in the art that it is not so limited, but is susceptible to various changes without departing from the scope of the invention.

That claimed is:

1. A cooling system assembly for an vehicle, comprising:
a heat exchanger having a plurality of fins for the transfer of heat to air passing therebetween, the heat exchanger having a pre-selected length, width, and thickness such that the heat exchanger fits adjacent an engine of the vehicle;
a plurality of fan assemblies positioned adjacent each other and juxtaposed the heat exchanger so that the fan assemblies cause air to travel across the fins when the fan assemblies are operating;
a plurality of mounting brackets protruding from a periphery of each of the fan assemblies, each of the mounting brackets having a set of ratchet grooves formed thereon and a bore extending therethrough; and
a bracket member associated with each of the plurality of mounting brackets, the bracket member connecting the mounting bracket to either the heat exchanger or to one of the mounting brackets of the other fan assembly.

2. The cooling system assembly of claim 1, wherein when the bracket member connects the mounting bracket to the heat exchanger comprises a support bracket that is positioned adjacent an edge of the heat exchanger, the support bracket being L-shaped so that the support bracket engages at least two sides of the heat exchanger and has a slot for receiving a threaded fastener to secure the support bracket to the heat exchanger, the support bracket having a mating set of ratchet grooves for engaging the ratchet grooves of the mounting bracket.

3. The cooling system assembly of claim 1, wherein when the bracket member connects the mounting bracket to the heat exchanger comprises a strap down bracket having a mating set of ratchet grooves for engaging the ratchet grooves of the mounting bracket and being adapted to receive an adjustable strap extending through the heat exchanger to secure the strap down bracket to the heat exchanger.

4. The cooling system assembly of claim 1, wherein when the bracket member connects the mounting bracket to the heat exchanger comprises a support bracket having a set of ratchet grooves that is positioned adjacent an edge of the heat exchanger and an extension bracket connecting the support bracket to the mounting bracket.

5. The cooling system assembly of claim 4, wherein the extension bracket comprises a pair of sets of ratchet grooves located at opposite end portions of the extension bracket and has a predetermined length such that the extension bracket extends from the mounting bracket at an angle and the sets of ratchet grooves provide resistance to the fan assemblies moving out of position relative to the heat exchanger due to gravitational forces.

6. The cooling system assembly of claim 1, wherein when the bracket member connects the mounting bracket to one of the mounting brackets of the other fan assembly comprises a joining bracket, the joining bracket having a pair of joining stabs, each of the joining stabs that stab into the bore of one of the mounting brackets adjacent a mounting bracket associated with the other fan assembly.

7. The cooling system assembly of claim 1, wherein the fan assemblies are scaleable in size such that a distance measured across both fans assemblies is less than or equal to the length of the heat exchanger.

8. The cooling system assembly of claim 7, wherein the mounting brackets are positioned such that a distance between adjacent mounting brackets associated with the adjacent fan assemblies is substantially the same regardless of the size of the adjacent fan assemblies.

9. The cooling system assembly of claim 1, wherein the fan assemblies are scaleable in size such that the width of the heat exchanger is greater than or equal to the circumference of each of the fans assemblies.

10. The cooling system assembly of claim 1, wherein each of the fan assemblies comprise:
a fan housing having a substantially circular sidewall and a substantially flat rear screen;
an impeller blade and motor assembly that connects to the rear screen; and
a substantially flat front screen that attaches to the fan housing;
wherein the impeller blade and motor assembly is free of any portion extending out of the fan housing beyond the front screen, such that the fan assembly can be mounted to the either a front side or a rear side of the heat exchanger and force air across the fins of the heat exchanger.

11. The cooling system assembly of claim 1, wherein the impeller blade of each fan assembly rotates in a single direction when operating such that the fan assemblies either push air across the heat exchanger or pull air across the heat exchanger, depending upon which side of the heat exchanger the fan assemblies are positioned.

12. A cooling system assembly for a vehicle, comprising:
a heat exchanger having a plurality of fins for the transfer of heat to air passing therebetween, the heat exchanger having a pre-selected length, width, and thickness such that the heat exchanger fits adjacent an engine of the vehicle;
a pair of fan assemblies positioned adjacent each other and juxtaposed the heat exchanger so that the fan assemblies cause air to travel across the fins when the fan assemblies are operating;
a first mounting bracket protruding from a periphery of each of the fan assemblies, each of the first mounting brackets having a set of ratchet grooves formed on its outer surface;
a mounting assembly associated with each of the first mounting brackets to connect the first mounting bracket to the heat exchanger and having a mating set of ratchet grooves that engage the ratchet grooves of the first mounting bracket associated therewith;
a second mounting bracket protruding from a periphery of each of the fan assemblies and positioned such that the second mounting bracket associated with one of the pair of fan assemblies is adjacent the second mounting bracket of the other of the pair of fan assemblies, each of the second mounting brackets having a bore formed therethrough; and
a coupling assembly connecting the second mounting brackets positioned adjacent each other.

13. The cooling system assembly of claim 12, wherein the mounting assembly comprises a support bracket that is positioned adjacent an edge of the heat exchanger, the support bracket being L-shaped so that the support bracket engages at least two sides of the heat exchanger and has a slot for receiving a threaded fastener to secure the support bracket to the heat exchanger.

14. The cooling system assembly of claim 13, wherein the mounting assembly further comprises an extension bracket connecting the support bracket to the first mounting bracket, the extension bracket comprises a pair of sets of ratchet grooves located at opposite end portions of the extension bracket and has a predetermined length such that the extension bracket extends from the first mounting bracket at an angle and the sets of ratchet grooves provide resistance to the fan assemblies moving out of position relative to the heat exchanger due to gravitational forces.

15. The cooling system assembly of claim 14, wherein there are a plurality of extension brackets having the predetermined length, each comprising a pair of sets of ratchet grooves located at opposite end portions thereof so that the plurality of extension brackets connect the first mounting bracket with the support bracket with each of the sets of ratchet grooves providing resistance to the fan assemblies moving out of position relative to the heat exchanger due to gravitational forces.

16. The cooling system assembly of claim 12, wherein the mounting assembly comprises a strap down bracket adapted to receive an adjustable strap extending through the heat exchanger to secure the strap down bracket to the heat exchanger.

17. The cooling system assembly of claim 12, wherein the coupling assembly comprises a joining bracket, the joining bracket having a pair of spaced-apart joining stabs that stab into the bores of the adjacent second mounting brackets.

18. The cooling system assembly of claim 17, wherein the joining bracket further comprises:
   a ratchet end having a set of ratchet grooves formed on its outer surface; and wherein
   the coupling assembly further comprises another mounting assembly that connects the joining bracket to the heat exchanger and has a mating set of ratchet grooves that engage the ratchet grooves of the ratchet end.

19. A cooling system assembly for a vehicle, comprising:
   a heat exchanger having a plurality of fins for the transfer of heat to air passing therebetween, the heat exchanger having a pre-selected length, width, and thickness such that the heat exchanger fits adjacent an engine of the vehicle;
   a plurality of fan assemblies positioned adjacent each other and juxtaposed the heat exchanger so that the fan assemblies cause air to travel across the fins when the fan assemblies are operating, each of the plurality of fan assemblies comprising:
      a fan housing having a substantially circular sidewall and a substantially flat rear screen;
      an impeller blade and motor assembly that connects to the rear screen;
      a substantially flat front screen that attaches to the fan housing; and
      a plurality of mounting brackets protruding from a periphery of each of the fan housings, each of the mounting brackets having a set of ratchet grooves formed thereon and a bore extending therethrough; and
   a bracket member associated with each of the plurality of mounting brackets, the bracket member connecting the mounting bracket to either the heat exchanger or to one of the mounting brackets of the other fan assembly; wherein:
   the impeller blade and motor assembly is free of any portion extending out of the fan housing beyond the front screen, such that the fan assembly can be mounted to the either a front side or a rear side of the heat exchanger and force air across the fins of the heat exchanger; and
   the impeller blade of each fan assembly rotates in a single direction when operating such that the fan assemblies either push air across the heat exchanger or pull air across the heat exchanger, depending upon which side of the heat exchanger the fan assemblies are positioned, the substantially flat rear screen being juxtaposed the front side of the heat exchanger when the fan pushes air across the fins and the substantially flat front screen being juxtaposed the rear side of the heat exchanger when the fan pulls air across the fins.

20. The cooling system assembly of claim 1, wherein the fan assemblies are scaleable in size such that a distance measured across both fans assemblies is less than or equal to the length of the heat exchanger; and
   the mounting brackets are positioned such that a distance between adjacent mounting brackets associated with the adjacent fan assemblies is substantially the same regardless of the size of the adjacent fan assemblies.

* * * * *